United States Patent

[19]

Alten

[11] 4,006,641

[45] Feb. 8, 1977

[54] METHOD AND APPARATUS FOR SENSING AND MEASURING FLUID PRESSURE

[75] Inventor: Ralph W. Alten, East Detroit, Mich.

[73] Assignee: Dynamic Industries, Inc., Warren, Mich.

[22] Filed: Jan. 5, 1976

[21] Appl. No.: 647,259

[52] U.S. Cl. .............................. 73/398 AR; 338/42
[51] Int. Cl.² .......................................... G01L 9/02
[58] Field of Search ......... 73/398 AR, 406; 338/42, 338/41, 114; 200/83 R, 83 A, 83 V, 83 WM, 83 J; 340/60

[56] References Cited

UNITED STATES PATENTS

| 3,525,262 | 8/1970 | Goran | 73/398 AR |
| 3,786,210 | 1/1974 | Byam | 338/42 |

Primary Examiner—Donald O. Woodiel
Attorney, Agent, or Firm—Cullen, Settle, Sloman & Cantor

[57] ABSTRACT

A method and apparatus for measuring fluid pressure by utilizing a plurality of resistor segments arranged in parallel in a normally opened electrical circuit. The apparatus includes a pair of spaced conductive plates and a compressible rubber-like pad interposed between the plates. The pad has a plurality of circular openings of differing diameters extending therethrough generally perpendicular to the conductive plates. A spherical contact element is located within each of the pad openings; and a respective resistor element is positioned to overly one end of each of the pad openings and to engage one of the conductive plates, the other of the conductive plates overlying the other end of each of the pad openings. The diameter of the spherical contact elements is less than the length of the pad openings so that under zero fluid pressure the contact elements do not simultaneously engage a respective resistor element and the second of the conductive plates, thereby defining a normally open circuit. The method of measuring fluid pressure includes compressing the pad in response to the pressure of the fluid, with that portion of the pad where a larger opening is located being initially compressed to a greater extent due to less pad material to resist deformation. As fluid pressure increases, the pad is compressed to a greater extent, and a greater number of spherical contact elements progressively make contact with both the second conductive plate and a respective resistor segment to progressively reduce the overall resistance of the system in substantially inverse proportion to the fluid pressure.

12 Claims, 10 Drawing Figures

METHOD AND APPARATUS FOR SENSING AND MEASURING FLUID PRESSURE

BACKGROUND OF THE INVENTION

1. Field of the Invention

The present invention relates generally to an improved method and apparatus for determining the pressure of a fluid. More specifically, the apparatus includes a deformable rubber pad which is compressed non-uniformly in response to fluid pressure to reduce the overall resistance of an electrical system in inverse proportion to the fluid pressure.

2. The Prior Art

Various types of switches and gauges have been used in the prior art to measure the pressure of fluids. For example, automobiles include either a so-called idiot-light or a gauge to provide a visual indication of oil pressure. The normal pressure switch used in an idiot-light circuit includes a spring-biased contact element responsive to oil pressure to close an electrical circuit when oil pressure is low, this type of switch being relatively simple in both construction and operation.

This contrasts rather sharply with the pressure switches that are required for gauge indicator systems, since a variable oil pressure measurement is constantly provided. The most common pressure switch used in the prior art for this type of system includes a plunger which moves a pivotal arm in response to oil pressure. The pivotal arm is in contact with a resistor element which generally takes the form of a wire wound around a non-conductive supporting element. At low oil pressures, the arm will be positioned at one extreme end of the resistor element to provide a relatively high resistance in the system. This, quite obviously, reduces electrical current flow to the readout gauge. At higher oil pressures, the plunger moves the pivotal arm along the resistor element to reduce the overall effective resistance to thereby increase electrical current flow through the system, so that the readout gauge will reflect the increased oil pressure.

Although the prior art pressure switches for gauge-type systems provide a relatively high degree of accuracy, they exhibit several shortcomings which are eliminated by the present invention. Specifically, the prior art devices exhibit a relatively high failure rate, apparently as a result of automotive engine vibration. More importantly, though, the prior art devices are relatively expensive due to the number of parts involved and the required assembly.

The present invention overcomes these problems by a device which includes a small number of moving parts that are relatively inexpensive and easily assembled.

SUMMARY OF THE INVENTION

The present invention relates to a method and apparatus for measuring the pressure of a fluid. In the most preferred embodiment, the present invention is designed for use in measuring the oil pressure in an automotive vehicle.

The disclosed apparatus includes a pair of spaced, substantially aligned electrical conductive components which are adapted to be electrically coupled with a power source, providing a normally opened electrical circuit. One of the conductive components may comprise resistor segments. A deformable rubber-like pad is interposed between the pair of conductive components and includes a plurality of openings extending therethrough generally perpendicular to the conductive components. An electrical contact element is located within each of the deformable pad openings to define parallel branches in the electrical circuit, each of the contact elements having a dimension along the axis of the pad opening less that the longitudinal length of the respective opening. Pressure transmitting means are provided for deforming the pad so that the contact elements progressively close the circuit between the pair of spaced conductive components to accomodate greater current flow in response to greater fluid pressures.

In one preferred embodiment the pad openings are circular shaped and have different diameters, the contact elements being spherical balls. In this embodiment, the compressible rubber pad is deformed non-uniformly so that the number of spherical contact elements establishing electrical communication between the pair of conductive components is directly proportional to the fluid pressure. The spherical contact elements may themselves be resistor elements, but in the most preferred embodiment separate resistor segments are interposed between the contact elements and one of the conductive components.

In one embodiment, the separate resistor segments are defined on a single, annular resistor wafer; and in a second embodiment the resistor segments are individual resistor components.

The many advantages and meritorious features of this invention will be appreciated from the following detailed description and the appended claims.

DETAILED DESCRIPTION OF THE PREFERRED EMBODIMENTS

Figure 1:
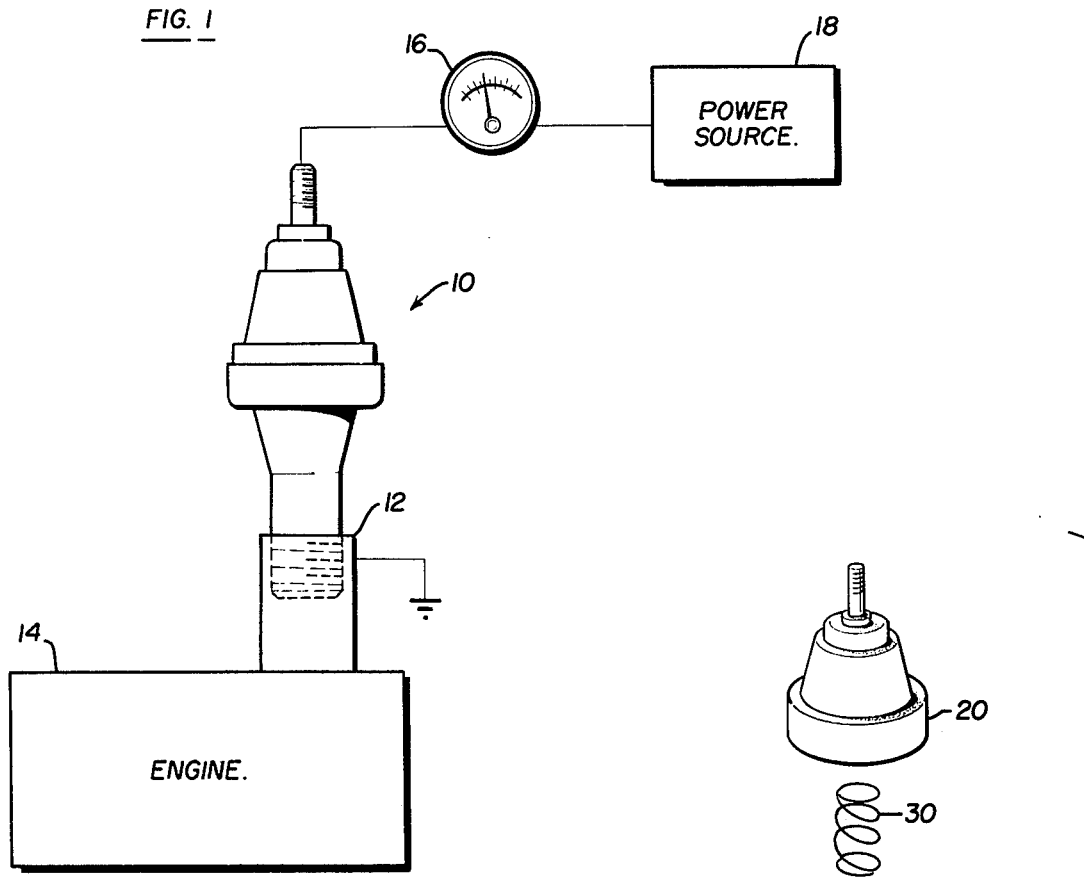
FIG. 1 is a partly schematic view illustrating the pressure sensing device of the present invention positioned in an engine for measuring oil pressure.

Referring now more specifically to the drawings, FIG. 1 illustrates the pressure sensing device 10 of the present invention received within a threaded fitting 12 in an engine block 14, which serves as an electrical ground. The other end of the pressure switch 10 is electrically intercoupled in series, such as by way of a suitable coupling, to a pressure gauge or ampmeter 16 and a power source 18. The disclosed embodiment of the pressure sensor 10 is designed for use in an automobile to measure the pressure of oil and to provide a corresponding visual readout on the pressure gauge 16 in the automobile instrument panel. In this environment, the power source will normally be a 5.1 volt DC source, but this is not critical to the invention. As more fully described below, the internal components of pressure switch 10 define a normally opened circuit when oil pressure is zero or very minimal, at which time there is no electrical current flow from the power source through the gauge 16 and the pressure sensor 10. When the engine develops an oil pressure during normal operating conditions, the inventive device 10 senses the pressure and accommodates electrical current flow through the electrical system defined by the power source 18, the gauge 16, and the sensor 10. Electrical flow will be in stepped, substantially direct proportion to the fluid pressure.

Figure 2:
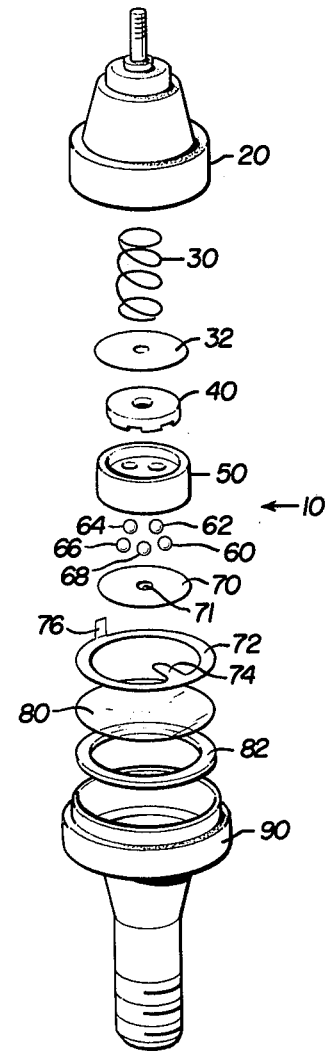
FIG. 2 is an exploded, perspective view illustrating the component parts of the present invention.

FIG. 2 illustrates the component parts of the pressure sensor 10, including the following components which will be described in greater detail in subsequent portions of this disclosure: an upper housing or terminal block 20; a copper coil spring 30; an upper conductive plate 32, which is preferably made of either brass or copper; a resistor element 40; a compressible rubber-like pad 50, which in the most preferred embodiment is comprised of EPDM (ethylene propylene diene monomer); a plurality of spherical contact elements 60, 62, 64, and 68, which may be made of steel, brass or copper; a lower conductive plate 70, which likewise is preferably made of brass or copper; a ground strap 72 which is also preferably made of either brass or copper; a circular, flexible, fluid impervious membrane 80, which in the most preferred embodiment is comprised of Mylar, a tradename of Dupont Corporation to designate a film material made of polyethylene terephthalate; a conventional gasket 82; and a lower housing 90. When assembled, these component parts will be arranged in the order as depicted in FIG. 2.

Figure 3:
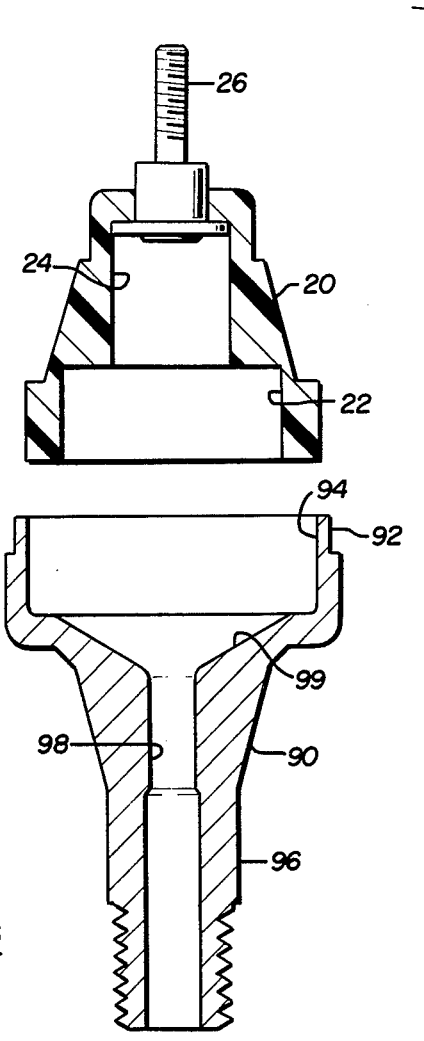
FIG. 3 is a cross-sectional view illustrating the two housing components for the pressure sensing device of this invention.

Turning now to the specifics of the various component parts, FIG. 3 illustrates the upper and lower housing parts 20 and 90. The upper housing 20 in the illustrated embodiment is comprised of a glass-filled molded polyester resin and includes first and second recesses 22 and 24, respectively. A threaded, electrically conductive terminal 26 is suitably secured in the upper portion of the housing 20 and provides the means for intercoupling the pressure switch 10 with the electrical power source 18.

Figure 4:
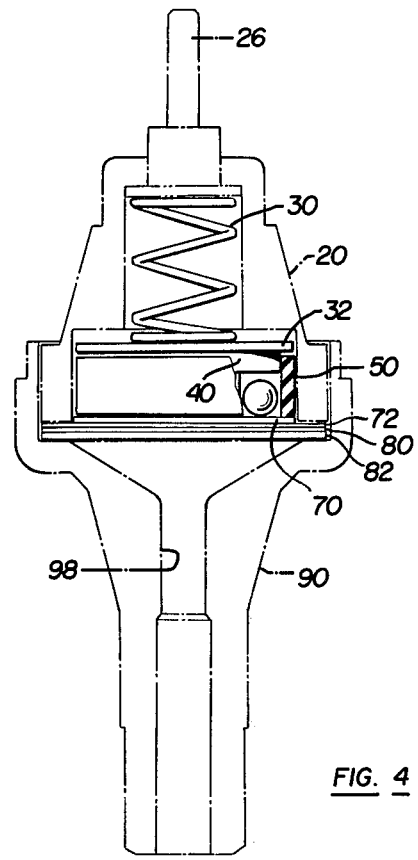
FIG. 4 is a partial cross-sectional view illustrating the internal component parts of this invention as positioned within the housing components.

The lower housing 90 is preferably comprised of a suitable electrically conductive metal, such as steel, and includes a flange lip 92 defining a first recess 94 that receives the lower portion of upper housing 20. A downwardly depending threaded extension 96 includes a bore 92 extending the entire length thereof and blending into the recess 94 by way of a tapered region 99. When assembled, as illustrated in FIG. 4, the upper and lower housing components 20 and 90 define as internal chamber for receiving all the other elements that are illustrated in FIG. 2.

Figure 5:
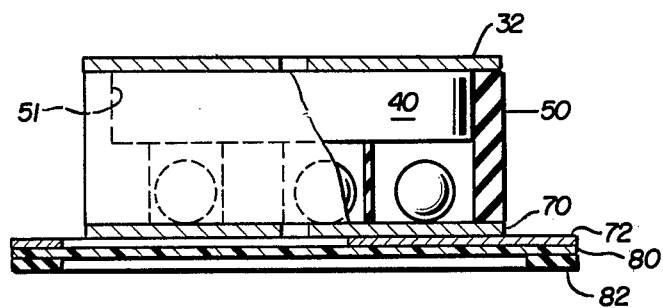
FIG. 5 is an enlarged, partial cross-sectional view of the internal components.
Figure 6:
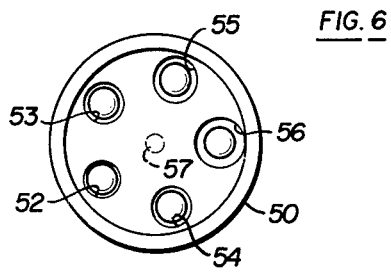
FIG. 6 is a bottom plan view of the compressible pad member of this invention, with the spherical contacting elements positioned within the pad bores.

FIGS. 5 and 6 collectively illustrate the configuration of the cylindrical compressible rubber-like pad 50, which includes a circular recess 51 for receiving the resistor element 40. An integral cylindrical tab 57 projects downwardly from the lower end face of pad 50, the lower conductive plate 70 having a circular opening 71 being fitted onto tab 57.

A plurality of circular bores or openings 52, 53, 54, 55, and 56 extend from the lower face of the compressible pad 50 to the recess 51 for receiving one of the spherical contact elements. As best seen in FIG. 6, each of the circular bores has a diameter which is different from any of the other bores for a purpose to be more fully explained in later portions of this disclosure. In the most preferred embodiment of this invention, bore openings 52–56 have respective diameters of about 0.130 inch, 0.140 inch, 0.150 inch, 0.160 inch, and 0.170 inch.

FIG. 5 illustrates another feature of the most preferred embodiment, namely that the length of each of the bores 52–56 is greater than the diameter of the spherical contact elements positioned therein. Accordingly, this defines a normally opened electrical circuit, with the resistor component 40 which is electrically intercoupled with the power source 18 being spaced from the electrical contact elements under zero fluid pressure conditions. In the most preferred embodiment, the length of each of the bores 52–56 is about 0.131 inch, and the diameter of the spherical contact elements is about 0.125 inch.

Figure 7:
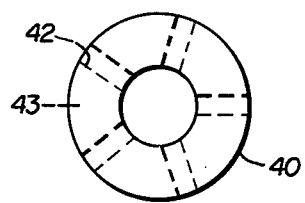
FIG. 7 is a bottom plan view of the resistor element utilized in the first preferred embodiment of this invention.

The resistor element 40 is illustrated in FIG. 7 and takes the form in one preferred embodiment of an annular wafer comprised of organic carbon in a phenolic resin binder. As illustrated, the lower face of the resistor element 40 includes five radially directed, equally spaced, recesses 42 to define five segment-shaped resistor faces 43 which overly each of the circular openings 52–57 in the compressible pad. This arrangement enables one single annular resistor wafer to be employed for defining five separate resistor segments which are arranged in parallel in the electrical circuit. Each of the segment-shaped faces, as well as the opposed face on the other side of the resistor element 40, may optionally be coated with a silver alloy for electrical conduction purposes.

Returning now to FIG. 2, the ground strap 72 takes the form of an annular ring, as illustrated, with a radially directed tab 74 and a vertical tab 76. When the component parts are assembled, the tab 74 engages the lower conductive plate 70 and the vertical tab 76 engages an inner sidewall portion of the lower housing 90 to accommodate electrical flow through the spherical contact elements to the engine block 14.

FIGS. 4 and 5 collectively illustrate the arrangement of the internal component parts of this invention when assembled within the housing members 20 and 90. Specifically, the copper coil spring 30 is located within the recess 24 of upper housing number 20 to contact and establish electrical communication between the terminal 26 and the upper conductive plate 32. Of course, electrical conduction means other than the coil spring 30 may be employed, but this particular element is preferred in order to absorb tolerances. As discussed previously, the resistor element 40 is positioned within the recess 51 of compressible pad member 50 so that segment faces 43 overly the bore openings 52–56, the upper surface of the resistor element being substantially flat and contacting the upper conductor plate 32. The spherical contact elements 60, 62, 64, 66, and 68 are positioned within the compressible pad bore openings 52–56, and with the pressure switch oriented as illustrated the contact elements engage the upper face of the lower conductive plate 70 without contacting any of the segment-shaped resistor faces 43. The ground strap 72 is interposed between the lower conductor plate 70 and the deflectable diaphraghm 80, with tab 74 engaging the lower conductor plate 70 and tab 76 engaging an inner sidewall of the lower housing 90. Gasket 82 is positioned at the extreme lower end of the recess 94 to prevent oil or other fluid from flowing past the tapered region 99.

Figure 8:
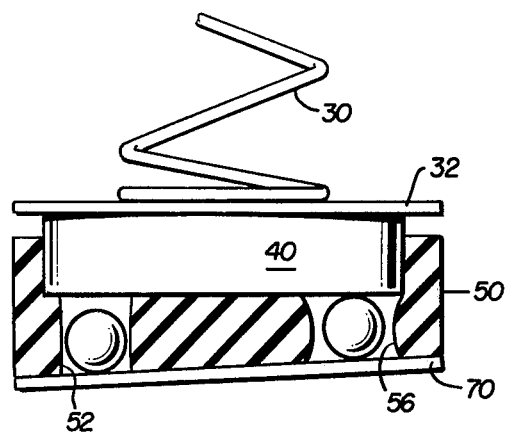
FIG. 8 is a partial cross-sectional view illustrating the non-uniform compression of the pad member in this invention to vary the resistance of the electrical system in inverse proportion to fluid pressure.

In operation, terminal 26 is electrically intercoupled to a power source and pressure gauge, and the extension 96 of the lower housing is threaded into a receptacle which supplies fluid under pressure through bore 98 into the tapered region 99. The fluid exerts a pressure against the deflectible diaphragm 80 which transmits the force against the lower portion of the compressible pad 50, causing the pad to compress non-uniformly due to the different sized bore openings 52–56. More specifically, that portion of the compressible pad 50 which includes the largest bores 56 will be compressed to a greater extent than the remaining portions of the pad, as illustrated in FIG. 8. It will be appreciated that the pad portion including bore 56 has less material and therefore offers less resistance to deformation. The pad portion which includes bore 55 will be compressed to a slightly lesser extent than that portion which includes bore 56, with the pad portions including bores 54,53, and 52 being compressed to lesser extents in that order.

Accordingly, at relatively low fluid pressures, only the contact element housed within bore 56 will simultaneously engage the lower conductor plate 70 and the resistor element 40. As will be appreciated by those in the electrical arts, under this condition a relatively high resistance will exist and a relatively low current flow will be established, the current flow being substantially directly proportional to the fluid pressure.

At higher fluid pressures, other portions of the compressible member will be deformed so that more than one of the spherical contacts elements will simultaneously engage the lower conductor 70 and a respective resistor segment. Since the resistors are connected in parallel, the resistance will be varied in stepped inverse proportion to the fluid pressure, and greater electrical current flow through the gauge 16 will reflect a greater fluid pressure.

Figure 9:
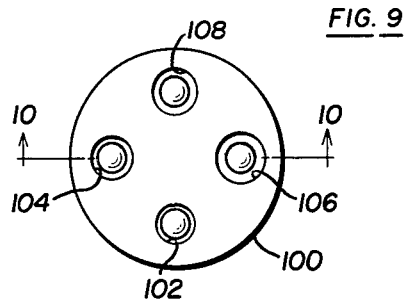
FIG. 9 is a bottom plan view of a second embodiment, illustrating an alternative compressible pad configuration.
Figure 10:
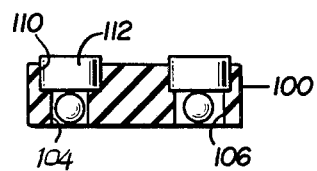
FIG. 10 is a cross-sectional view taken along line 10—10, as indicated in FIG. 9.

Turning now to FIGS. 9 and 10, a second embodiment is illustrated for the compressible pad and the resistor elements, the other components illustrated in FIG. 2 being unchanged. In this embodiment, the compressible rubber-like pad 100 includes four bores or openings 102,104,106 and 108 having different sized diameters in the same manner as the compressible pad 50 disclosed and described in the first preferred embodiment. The compressible pad also includes a plurality of recesses 110 in alignment with the bore openings to receive individual, cylindrical resistor elements 112. A spherical contact element is positioned within each of the pad openings in the same manner as described in relation to the first embodiment. Likewise, the pad 100 is compressed non-uniformly, so that the portion including the largest bore opening is initially compressed to a greater extent than the remaining portions. Four pad bores are disclosed in this embodiment simply because of the geometry and size of the resistor components 110.

It is to be understood that the foregoing disclosure is merely exemplary of the overall invention and that various modifications can be made without departing from the novel operational aspects. For example, the lower conductor member 70 and the ground strap 72 could be comprised of a single component. Further, the contact elements could have a cylindrical configuration rather than the illustrated spherical shape, or the contact elements could be resistors, thereby eliminating the necessity for a separate resistor element.

Having therefore completely and fully disclosed my invention, I now claim:

1. In an apparatus adapted to provide a normally open electrical circuit for sensing the pressure of a fluid, including:
   a housing defining an internal chamber and including a bore extending from the chamber for communicating with said fluid;
   a deflectable diaphragm positioned in said chamber and overlying said bore, the fluid being permitted to flow through the bore against said diaphragm but being prevented from flowing into said chamber, the diaphragm being deflected in response to fluid pressure;
   a pair of spaced, electrically conductive members within said chamber providing a normally open electrical circuit, said conductive members being in general alignment with said diaphragm;
   a deformable, resilient pad interposed between said spaced electrically conductive members, the pad having a plurality of openings extending therethrough substantially perpendicular to said electrically conductive members, the longitudinal dimension of each of said openings being substantially the same and the transverse dimension of each opening being different;
   an electrical contact element positioned within each of said openings providing parallel branch elements in an electrical circuit, the longitudinal dimension of each contact element being less than the corresponding longitudinal dimension of each of said openings to provide a normally opened circuit, and a resistor element associated with each contact element whereby the flow of electrical current through said normally opened circuit a proportional to the pressure of said fluid, said pad being deformed in response to the fluid pressure and to the deflection of the diaphragm such that the contact element which is in the largest of said openings closes the electrical circuit first, with the remainder of said contact elements progressively closing the circuit at increased fluid pressure to accommodate increased electrical current flow.

2. In an apparatus for varying electrical current flow, including:
   a pair of spaced, substantially aligned electrical conductive components, at least one of said components being adapted for electrical intercoupling with an electrical power source, and wherein one of said conductive components includes a plurality of resistors segments;
   a deformable member interposed between said pair of conductive components and having a plurality of openings extending therethrough generally perpendicular to said components, the longitudinal dimension of each of said openings being substantially the same and the transverse dimension of each opening being different;
   an electrical contact element within each of said openings, defining parallel branches in a normally open electrical circuit, each of said contact elements having a dimension along the axis of each respective opening less than the longitudinal length of the respective opening to define the normally opened circuit; and pressure transmitting means for a compressing said deformable member to reduce the length of each opening, the contact elements progressively closing the circuit between said pair of spaced conductive components to accommodate greater current flow in response to greater applications of force by said pressure transmitting means.

3. A pressure switch adapted to vary the flow of electrical current in a normally opened circuit in substantially direct proportion to a fluid pressure, comprising:

a housing defining a chamber, with a fluid opening extending from the chamber and being adapted to receive a fluid under pressure;

a deflectable, fluid impervious membrane positioned within the chamber to overly the fluid opening and to at least in part prevent fluid from entering said chamber;

a pair of spaced, generally parallel electrical conductors positioned within said chamber in general alignment with said membrane, one of said conductors being located adjacent said membrane and the second of said conductors being located at an opposed portion of said chamber, at least one of said conductors being adapted for electrical intercoupling with an electrical power source;

a compressible, resilient pad interposed between said pair of spaced conductors, the pad having a plurality of openings extending therethrough in a direction generally perpendicular to said conductors, with the cross-sectional area of each said opening being different;

a resistor segment overlying one end of each said pad opening and contacting the second electrical conductor;

an electrically conductive contact element within each of said pad openings, each such contact element having a dimension along the axis of each respective opening less than the longitudinal length of such respective opening to provide a normally opened circuit, the normally opened circuit being closed by differential compression of said pad due to the fluid pressure initially deforming to a greater extent that portion of the pad which includes a larger opening so that the contact element within said larger opening becomes in contact with both said first conductor and the respective resistor segment, the other of said contact elements progressively becoming in contact with both the first conductor and a respective resistor segment in response to increased fluid pressure further deforming the other portions of said pad.

4. The pressure switch as defined in claim 3, characterized by said resistor segments being defined on a single resistor wafer.

5. The pressure switch as defined in claim 4, wherein said housing is comprised of first and second sections, the first section (a) being comprised of metal (b) including a threaded extension, and (c) including the fluid opening through said threaded section; the second section including a terminal adapted for electrical intercoupling with an electrical power source.

6. The pressure switch as defined in claim 5, further including a gasket between the fluid opening and said membrane, and a coil spring interposed between said second conductor and the terminal in the second housing section to provide an electrical flow path therebetween.

7. The pressure switch as defined in claim 3, characterized by said resistor segments being comprised of individual resistor elements.

8. The pressure switch as defined in claim 3, characterized by said housing defining a generally cylindrical chamber, said membrane, conductors and pad all having generally circular configurations nesting within said cylindrical chamber.

9. The pressure switch as defined in claim 8, characterized by the openings in said pad being generally circular in cross-section and having different diameters; said contact elements being spherical.

10. An apparatus for varying electrical current flow in an electrical circuit, comprising:

a plurality of resistor segments arranged in parallel in the electrical circuit;

a conductive element spaced from and aligned with the resistor segments;

resilient means interposed between the plurality of resistor segments and the conductive element, said resilient means (a) spacing the segments and the conductive element to define a normally opened electrical circuit and (b) including openings therethrough in alignment with each respective resistor segment; and (c) having a contact element within each of said openings, with the dimension of each said contact element in the direction perpendicular to a line interconnecting the conductive element with each resistor segment being less than the corresponding dimension of the respective opening in the resilient means, said, resilient means being compressible for progressively electrically intercoupling the conductive element with said resistor segments to vary the flow of electrical flow in the circuit.

11. In a method of measuring the pressure of a fluid, the steps of:

interconnecting a pressure sensing device (a) in electrical series with a power source and an ampmeter and (b) in fluid communication with a fluid, the pressure sensing device including a compressible pad responsive to the fluid pressure, the pad including a plurality of generally parallel bores therethrough, an electrically conductive contact member within each of said bores, an electrically conductive contact plate engaging the compressible pad to overly one end of said bores for engaging said contact members, and a resistor segment overlying the other end of each of said bores for engaging the contact members, the length of said bores being greater than the corresponding dimension of the contact elements when the pad is in a relaxed, uncompressed state so that the contact elements do not simultaneously touch both the contact plate and the respective resistor segment;

compressing the pad in response to the fluid pressure and electrically intercoupling said conductive plate and said resistor segments by a number of the contacting elements progressively electrically interconnecting a greater number of the resistor segments with said electrically conductive contact plate by reducing the length of said bores during the compression of the pad and by progressively placing the contact elements in contact with the contact plate and a respective resistor element, the number of said contacting elements which are simultaneously in engagement with the conductive plate and a respective resistor segment being substantially in direct proportion to the pressure of the fluid, thereby accommodating electrical current flow through the pressure sensing device and the ampmeter in substantially direct proportional relationship to the fluid pressure.

12. The method as defined in claim 11, wherein each of the bores through said compressible pad has a different cross-sectional area, and the step of compressing being characterized by initially compressing that portion of the pad with the largest of the bores to a greater extent to effect electrical engagement first between the contacting element within said largest bore and the conductive plate and respective resistor segment, the other portions of said pad being progressively compressed to such an extent that electrical contact is made by the respective contacting elements therein (a) in direct relation to the pressure of said fluid and (b) in inverse order of the bore size in that portion of the pad.

* * * * *